United States Patent
Liao et al.

(10) Patent No.: US 10,440,125 B2
(45) Date of Patent: *Oct. 8, 2019

(54) METHOD FOR MAINTAINING TRANSMISSION CONTROL PROTOCOL CONNECTION AND COMPUTER SYSTEM USING THE METHOD

(71) Applicant: Acer Incorporated, New Taipei (TW)

(72) Inventors: Shu-Chun Liao, New Taipei (TW); Ching-Ho Tsai, New Taipei (TW); Siang-Sheng Jheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,962

(22) Filed: Sep. 28, 2017

(65) Prior Publication Data

US 2018/0020061 A1    Jan. 18, 2018

Related U.S. Application Data

(63) Continuation of application No. 14/664,907, filed on Mar. 22, 2015, now Pat. No. 9,813,507.

(30) Foreign Application Priority Data

Feb. 11, 2015    (TW) .............................. 104104520 A

(51) Int. Cl.
*H04L 29/06* (2006.01)
*H04L 29/08* (2006.01)
(Continued)

(52) U.S. Cl.
CPC .......... *H04L 67/142* (2013.01); *G06F 1/3209* (2013.01); *G06F 1/3287* (2013.01);
(Continued)

(58) Field of Classification Search
CPC .......... H04L 67/42; H04L 41/50; H04L 67/10
(Continued)

(56) References Cited

U.S. PATENT DOCUMENTS

| | | | | |
|---|---|---|---|---|
| 6,675,203 B1* | 1/2004 | Herrod | ................. | G06Q 10/087 709/217 |
| 7,633,955 B1* | 12/2009 | Saraiya | ................. | H04L 49/356 370/395.31 |
| 8,892,748 B1* | 11/2014 | Wootton | ................. | H04L 65/00 370/351 |
| 2006/0199621 A1* | 9/2006 | Stirbu | ............... | H04W 52/0225 455/574 |

(Continued)

FOREIGN PATENT DOCUMENTS

| | | |
|---|---|---|
| CN | 101004631 | 7/2007 |
| CN | 101131606 | 2/2008 |

(Continued)

OTHER PUBLICATIONS

"Performance Analysis of TCP's Retransmission Timeout Mechanism"—Nabil Seddigh, University of Waterloo, Dec. 20, 2000 (Year: 2000) https://pdfs.semanticscholar.org/ec31/19474b1db4cec9cbf567fcd4f8500bd5fb72.pdf.*

*Primary Examiner* — Randy A Scott
(74) *Attorney, Agent, or Firm* — JCIPRNET

(57) ABSTRACT

A method for maintaining transmission control protocol (TCP) connection and a computer system are provided. The method is adapted to a computer system having a network card and a processor, wherein the processor executes an operating system. In the method, a first TCP connection with a remote server is first established via the network card. Then, after the operating system enters a power saving mode, a wake-up packet transmitted by the remote server through the first TCP connection is received to wake the operating system. The operating system resets the retransmission time of the remote server transmitting the wake-up packet when resuming a normal operation mode.

6 Claims, 4 Drawing Sheets

(51) Int. Cl.
  *G06F 1/32* (2019.01)
  *G06F 15/16* (2006.01)
  *G06F 15/173* (2006.01)
  *G06F 1/3209* (2019.01)
  *G06F 1/3287* (2019.01)
  *G06F 1/3293* (2019.01)

(52) U.S. Cl.
  CPC ............ G06F 1/3293 (2013.01); H04L 67/10 (2013.01); H04L 69/16 (2013.01); *Y02D 10/122* (2018.01); *Y02D 10/171* (2018.01); *Y02D 30/30* (2018.01)

(58) Field of Classification Search
  USPC ........ 709/204, 221, 225, 227, 230; 455/418, 455/518, 574
  See application file for complete search history.

(56) References Cited

U.S. PATENT DOCUMENTS

| | | | |
|---|---|---|---|
| 2010/0122008 A1 | 5/2010 | Goss | |
| 2013/0007484 A1* | 1/2013 | Gobriel | G06F 1/3209 |
| | | | 713/320 |
| 2013/0159806 A1* | 6/2013 | Okuno | H04L 1/18 |
| | | | 714/749 |
| 2014/0095901 A1* | 4/2014 | Stefanov | G06F 1/3206 |
| | | | 713/310 |

FOREIGN PATENT DOCUMENTS

| | | |
|---|---|---|
| CN | 101174935 | 5/2008 |
| CN | 101534200 | 9/2009 |
| CN | 101739115 | 6/2010 |
| CN | 102299943 | 12/2011 |
| CN | 102693136 | 9/2012 |

* cited by examiner

METHOD FOR MAINTAINING TRANSMISSION CONTROL PROTOCOL CONNECTION AND COMPUTER SYSTEM USING THE METHOD

CROSS-REFERENCE TO RELATED APPLICATION

This application is a continuation application of and claims the priority benefit of U.S. application Ser. No. 14/664,907, filed on Mar. 22, 2015, now allowed, which the priority benefit of Taiwan application serial no. 104104520, filed on Feb. 11, 2015. The entirety of each of the above-mentioned patent applications is hereby incorporated by reference herein and made a part of this specification.

BACKGROUND OF THE INVENTION

Field of the Invention

The invention relates to a method and an apparatus for maintaining network connection, more particularly, to a method for maintaining transmission control protocol connection and a computer system using the method.

Description of Related Art

In recent years, as computer technology advances, remote control techniques are becoming increasingly popular. A user can arbitrarily perform an operation on a computer system remotely via the network. For instance, a general user can manipulate an office computer system at home via remote control to obtain the desired data or perform a remote task. A system administrator can further remotely obtain a message such as hardware status, system event, and system log of the computer system via remote control, so as to control the status of the computer system at any time and not be limited by time and space.

In the current remote control techniques, a remote computer system generally has a network card supporting a wake on LAN (WOL) function so as to still receive a remote wake-up command after entering a hibernation status or a shutdown status. When the user performs a remote operation, a WOL command is transmitted to a remote computer system via the network, such that the computer system can be waken up from a hibernation status, resume operation statuses, or change from a shutdown status to a power-on status to facilitate the user controlling the computer system remotely.

The user generally can perform WOL on the computer system which is in the hibernation or shutdown status through transmission control protocol (TCP) via the network. The computer system and the remote server may establish a connection by using a handshaking procedure of TCP when establishing the TCP connection. However, the computer system in the hibernation or shutdown status cannot instantly return an acknowledgment (ACK) packet after receiving a wake-up packet of the remote server, and at this point the remote server begins to attempt retransmission. In particular, the remote server presets a retransmission time to wait for the remote computer system to return the ACK packet. If the remote server does not receive the response of the remote computer system within the retransmission time, the remote server attempts retransmission again, and doubles the retransmission time as the number of retransmissions is increased.

For instance, referring to FIG. 1A, FIG. 1A is a schematic diagram of packet exchange of WOL executed by a TCP connection. When the computer system enters a power saving mode 130 from a normal operation mode 120, the remote server transmits a wake-up packet to wake up the computer system, wherein the preset retransmission time of the remote server is 300 milliseconds (ms). If the computer system does not return the ACK packet after receiving the wake-up packet of the remote server, the remote server attempts a first retransmission of the wake-up packet after waiting 300 ms, and doubles the retransmission time of the next wait to 600 ms; if the computer system still does not return the ACK packet after receiving the first retransmission of the wake-up packet of the remote server, the remote server attempts a second retransmission of the wake-up packet after waiting 600 ms, and doubles the retransmission time of the next wait to 1200 ms; if the computer system still does not return the ACK packet after receiving the second retransmission of the wake-up packet of the remote server, the remote server attempts a third retransmission of the wake-up packet after waiting 1200 ms; lastly, since the computer system already resumes a normal operation status (i.e., normal operation mode 120) when receiving the third retransmission of the wake-up packet of the remote server, the operating system of the computer system returns the ACK packet.

In particular, since after the wake-up packet of the remote server reaches the network card of the computer system, the computer system needs time to resume the normal operation status to answer the ACK packet, every wake-up during resuming increases the retransmission time of the remote server until the maximum allowed by the remote server (such as 1 minute for the Windows system). When the retransmission time of the remote server is increased to the maximum allowed by the system, every time the remote server executes the wake-up procedure, the remote server has to wait for the maximum of the retransmission time so as to execute the next wake-up procedure.

Referring to FIG. 1B, FIG. 1B is a schematic diagram of packet switching of WOL executed by a TCP connection using a maximum of retransmission time. When the remote server wakes up the computer system to make the computer system resume the normal operation mode 120, if the time of the computer system executing other applications is very short such that the computer system resumes the power saving mode 130 from the normal operation mode 120 again, the computer system does not answer the ACK packet to the remote server. Therefore, when the remote server reaches the maximum of the retransmission time (such as 1 minute), a first retransmission is attempted to wake up the computer system. At this point, since the remote server has no requirement to transmit data, the computer system may return to the power saving mode 130 from the normal operation mode 120 within the maximum of the retransmission time, and fail to reply the ACK packet. The above condition occurs repeatedly and after five retransmissions, the TCP connection is disconnected, and the remote server can no longer transmit the wake-up packet via the TCP connection, such that the user cannot wake up the computer system via a network.

It can be known from the above that, although the retransmission mechanism of TCP can achieve reliable connection, if such architecture is applied on WOL, disconnection may occur such that the connection becomes unreliable.

SUMMARY OF THE INVENTION

Accordingly, the invention provides a method for maintaining transmission control protocol (TCP) connection. The method can prevent disconnection due to excessive retransmission time of a remote server transmitting a wake-up packet, thus ensuring the wake on LAN (WOL) function is not unachievable due to disconnection.

A method for maintaining TCP connection of the invention is adapted to a computer system having a network card and a processor, wherein the processor executes an operating system. In the method, a first TCP connection with a remote server is first established via the network card. Then, after the operating system enters a power saving mode, a wake-up packet transmitted by the remote server through the first TCP connection is received to wake up the operating system. The operating system resets the retransmission time of the remote server transmitting the wake-up packet when resuming a normal operation mode.

A method for maintaining TCP connection of the invention is adapted to a computer system having a network card and a processor, wherein the processor executes an operating system. In the method, a first TCP connection with a remote server is first established via the network card. Then, after the operating system enters a power saving mode, a wake-up packet transmitted by the remote server through the first TCP connection is received to wake up the operating system. Whether the system load of the computer system is greater than a critical value is determined when the operating system resumes a normal operation mode. In particular, if the system load is greater than the critical value, a data packet is transmitted to the remote server through the first TCP connection so as to control the remote server to reset the retransmission time of the wake-up packet; if the system load is not greater than the critical value, a second TCP connection is reestablished with the remote server via the network card to reset the retransmission time of the wake-up packet.

A computer system of the invention includes a network card and a processor. The processor is coupled to the network card and configured to execute an operating system. The processor establishes a first TCP connection with a remote server via the network card, receives a wake-up packet transmitted by the remote server through the first TCP connection via the network card when the operating system enters a power saving mode to wake the operating system, and resets the retransmission time of the remote server transmitting the wake-up packet when the operating system resumes a normal operation mode.

Based on the above, in the method for maintaining TCP connection and the computer system using the method of the invention, when the computer system resumes a normal operation mode, the retransmission time of the TCP connection is reset through the active transmission of the data packet to the remote server such that the retransmission time of the TCP connection returns to a preset time, or a new TCP connection with the remote server is reestablished to reset the retransmission time of the TCP connection, such that the retransmission time of the TCP connection similarly returns to the preset time. Accordingly, disconnection due to excessive retransmission time of the remote server transmitting the wake-up packet can be prevented, thus ensuring the remote server can wake the computer system.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Regarding the issue of disconnection caused by excessive time of a remote server retransmitting a wake-up packet through transmission control protocol (TCP) connection due to excessive time of a computer system resuming from a power saving mode, in the invention, the retransmission time of the remote server transmitting the wake-up packet is reset via a method of actively transmitting a data packet or reestablishing connection when the computer system resumes a normal operation mode. Accordingly, the connection of the remote server and the computer system can remain free of disconnections, thus ensuring the remote server can wake up the computer system.

Figure 1A:
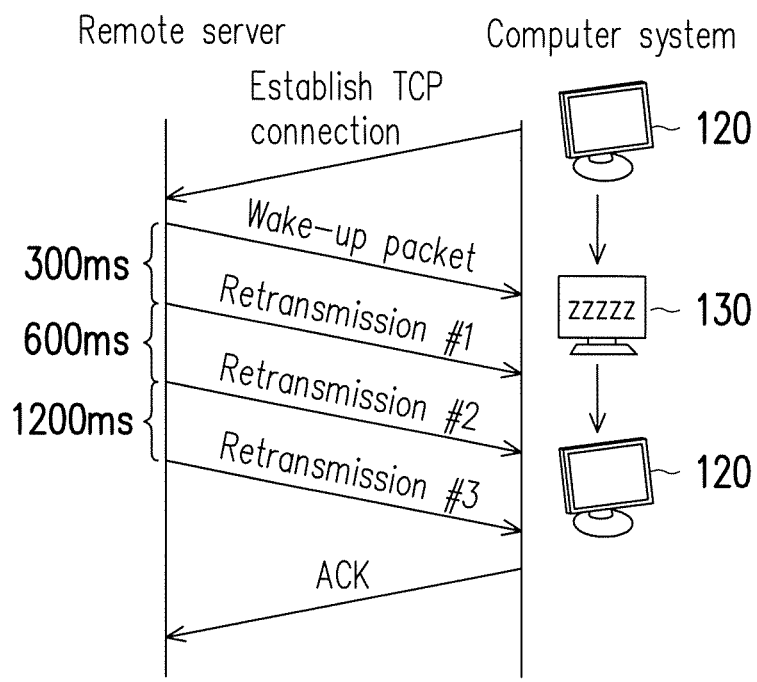
FIG. 1A is a schematic diagram of packet switching of wake on LAN (WOL) executed by a transmission control protocol (TCP) connection.
Figure 1B:
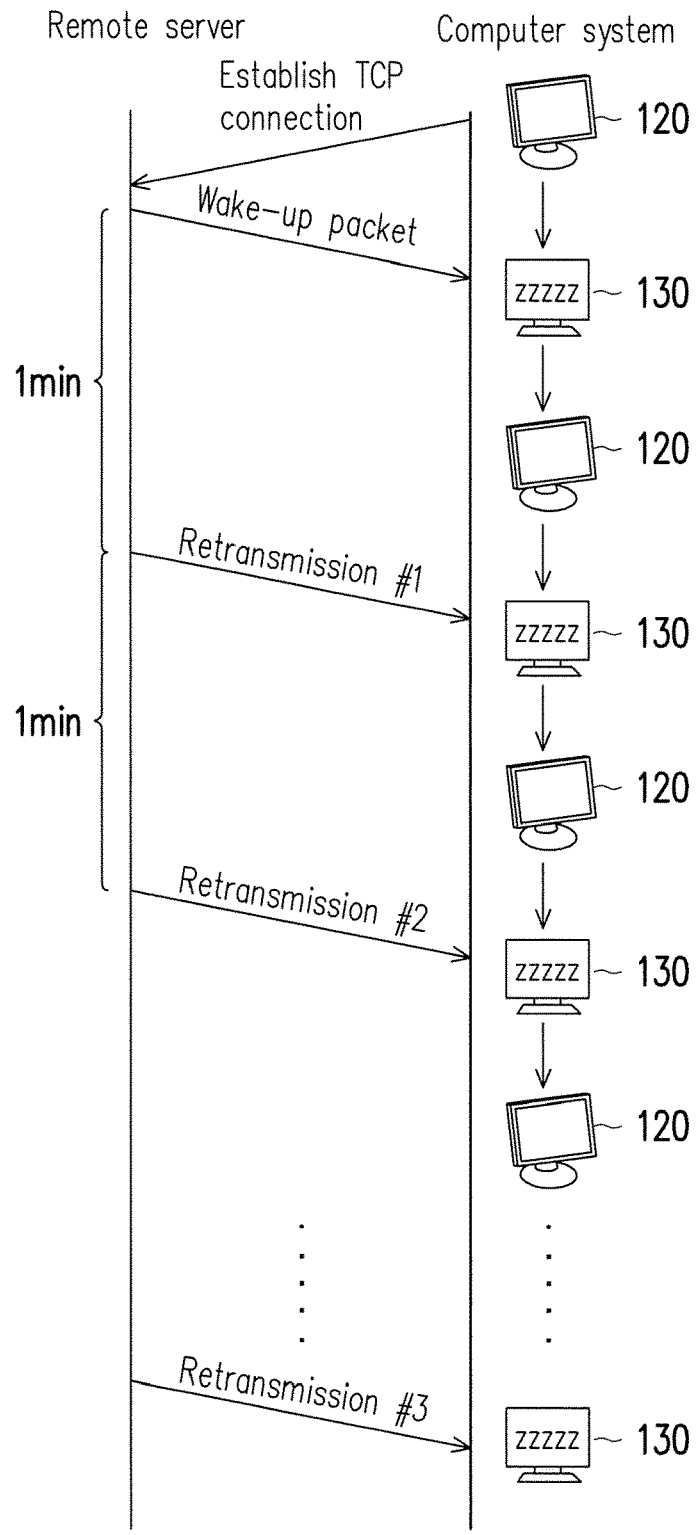
FIG. 1B is a schematic diagram of packet switching of a WOL executed by a TCP connection using a maximum of retransmission time.
Figure 2:
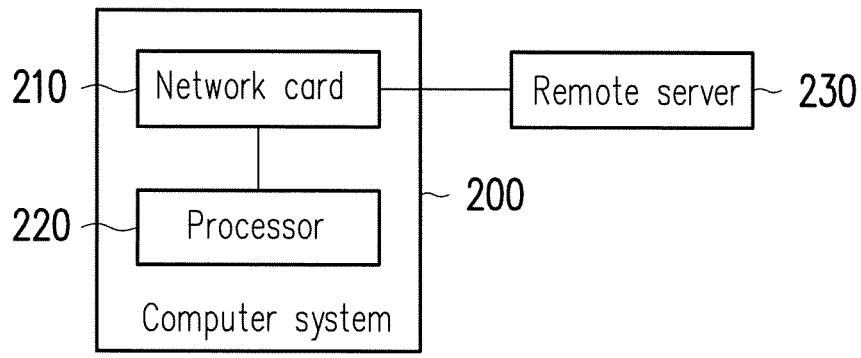
FIG. 2 is a block diagram of a computer system illustrated according to an embodiment of the invention.

FIG. 2 is a block diagram of a computer system illustrated according to an embodiment of the invention. Referring to FIG. 2, a computer system 200 of the present embodiment is, for instance, a computer apparatus such as a desktop computer, a notebook computer, or a server, wherein the computer system 200 includes a network card 210 and a processor 220, and the functions thereof are respectively described below.

The network card 210 is, for instance, a wireless network card supporting wireless communication standard such as Institute of Electrical and Electronics Engineers (IEEE) 802.11n/b/g or a network card supporting wired network connection. Network connection can be established between the network card 210 and other external apparatuses (such as a remote server 230) in a wireless or wired manner.

The processor 220 is, for instance, a central processing unit (CPU) or other programmable microprocessors for conventional use or special use, a digital signal processor (DSP), a programmable controller, an application specific integrated circuit (ASIC), a programmable logic device (PLD), other similar apparatuses, or a combination of those apparatuses. The processor 220 is coupled to the network card 210 and configured to execute an operating system to achieve the function of maintaining TCP connection. The detailed steps of the computer system 200 maintaining TCP connection are described below via embodiments.

Figure 3:
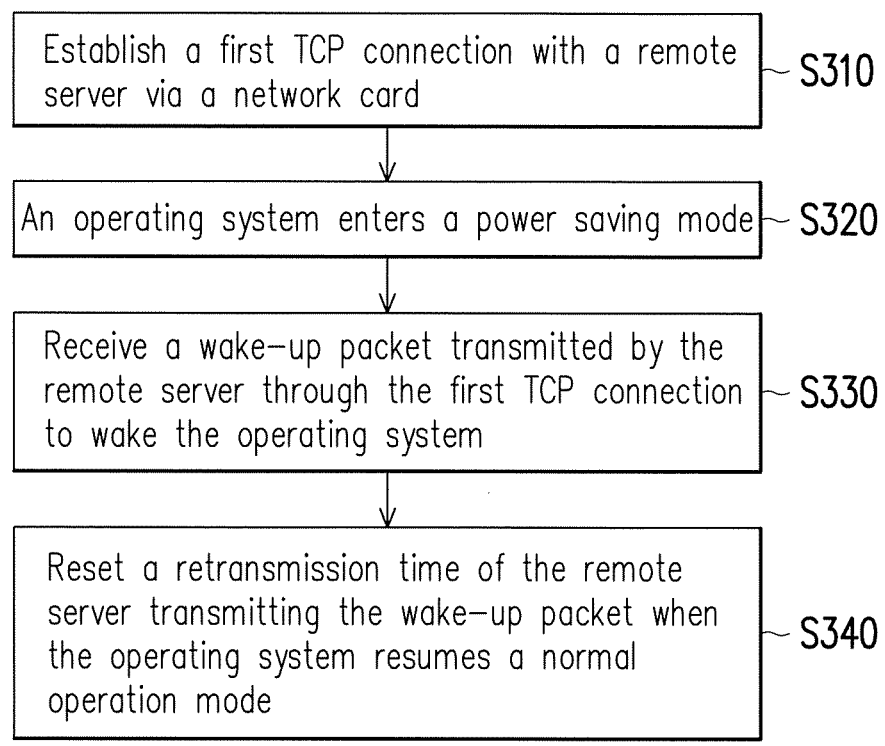
FIG. 3 is a flow chart of a method for maintaining TCP connection illustrated according to an embodiment of the invention.

FIG. 3 is a flow chart of a method for maintaining TCP connection illustrated according to an embodiment of the invention. Referring to both FIG. 2 and FIG. 3, the method for maintaining TCP connection of the present embodiment is adapted to the computer system 200 of FIG. 2. In the following, each step of the method for maintaining TCP connection of the invention is described with reference to each device in the computer system 200.

In step S310, the processor 220 establishes a first TCP connection with the remote server 230 via the network card 210. The remote server 230 can be a cloud server connected to a network, or a server group composed of a plurality of physical equipment through cloud hardware sharing technology. There are many varieties of the hardware equipment of the remote server 230, and the invention does not particularly limit the type of the hardware equipment of the remote server 230. In an embodiment of the invention, the processor 220 establishes the TCP connection between the computer system 200 and the external remote server 230 via the network card 210 by executing a network module of the operating system. In this way, after TCP connection is established between the computer system 200 and the remote server 230, the computer system 200 can communicate with the remote server 230 via a network.

In step S320, the operating system enters a power saving mode. Specifically, when the computer system 200 is connected with the remote server 230, the computer system 200 may automatically or manually enter the power saving mode and stop power supply to the processor 220 so as to reduce power consumption of the computer system 200. When the operating system executed by the computer system 200 enters the power saving mode, the wake-up packet of the remote server 230 can still be received via the network card 210, and the computer system 200 in the power saving mode can be waken as a result, such that the computer system 200 resumes a normal operation mode from the power saving mode. It should be mentioned that, in the present embodiment, the power saving mode of the computer system 200 is, for instance, a standby mode (S1 mode), a sleep mode (S3 mode), a hibernation mode (S4 mode), or a shutdown mode (S5 mode) specified by an advanced configuration and power interface (ACPI), and the normal operation mode of the computer system 200 is, for instance, an S0 mode specified by ACPI, but the embodiments of the invention are not limited thereto. In an embodiment of the invention, the computer system 200 enters the power saving mode under a preset condition (such as not receiving any command in a preset time).

Then, in step S330, the processor 220 receives the wake-up packet transmitted by the remote server 230 through the first TCP connection via the network card 210 to wake the operating system. In the present embodiment, the user can issue a command to the remote server 230, and the wake-up packet can be transmitted via the remote server 230 through the TCP connection between the remote server 230 and the computer system 200, so as to perform wake on LAN (WOL) on the computer system 200 in the power saving mode, and thereby remotely access the data of the computer system 200.

It should be mentioned that, due to the characteristics of TCP, the remote server 230 needs to wait for the computer system 200 to return an acknowledgment (ACK) packet every time after transmitting the wake-up packet. Therefore, the remote server 230 presets a retransmission time to wait for the ACK packet returned by the computer system 200. If the ACK packet is still not received after waiting the retransmission time, the remote server 230 transmits the wake-up packet again and doubles the retransmission time of waiting.

Regarding the above characteristics, in the present embodiment, to prevent an increase in retransmission time and the resulting disconnection, in step S340, when the operating system resumes normal operation mode, the processor 220 resets the retransmission time of the remote server 230 transmitting the wake-up packet. It should be mentioned that, the invention provides two methods to reset the retransmission time of the remote server 230 transmitting the wake-up packet to make the retransmission time return to a system preset value.

In an embodiment, when the operating system executed by the computer system 200 resumes a normal operation mode, the processor 220 actively transmits a data packet to the remote server 230 through the first TCP connection established in step S310 to control the remote server 230 to reset the retransmission time of the wake-up packet. The form of the transmitted data packet is not particularly limited, as long as the data packet includes a message of resetting the retransmission time of the wake-up packet for the remote server 230 to identify.

In another embodiment, when the operating system executed by the computer system 200 resumes a normal operation mode, the processor 220 disconnects the first TCP connection established in step S310. Then, the processor 220 reestablishes a second TCP connection with the remote server 230 via the network card 210 to reset the retransmission time of the wake-up packet.

In short, in the invention, by resetting the retransmission time of the remote server 230 transmitting the wake-up packet via the above two methods, the TCP connection between the remote server 230 and the computer system 200 will not be disconnected due to excessive retransmission time of the wake-up packet. Therefore, the invention can ensure that the remote server 230 can wake up the computer system 200 based on the reliability of the TCP connection.

Figure 4:
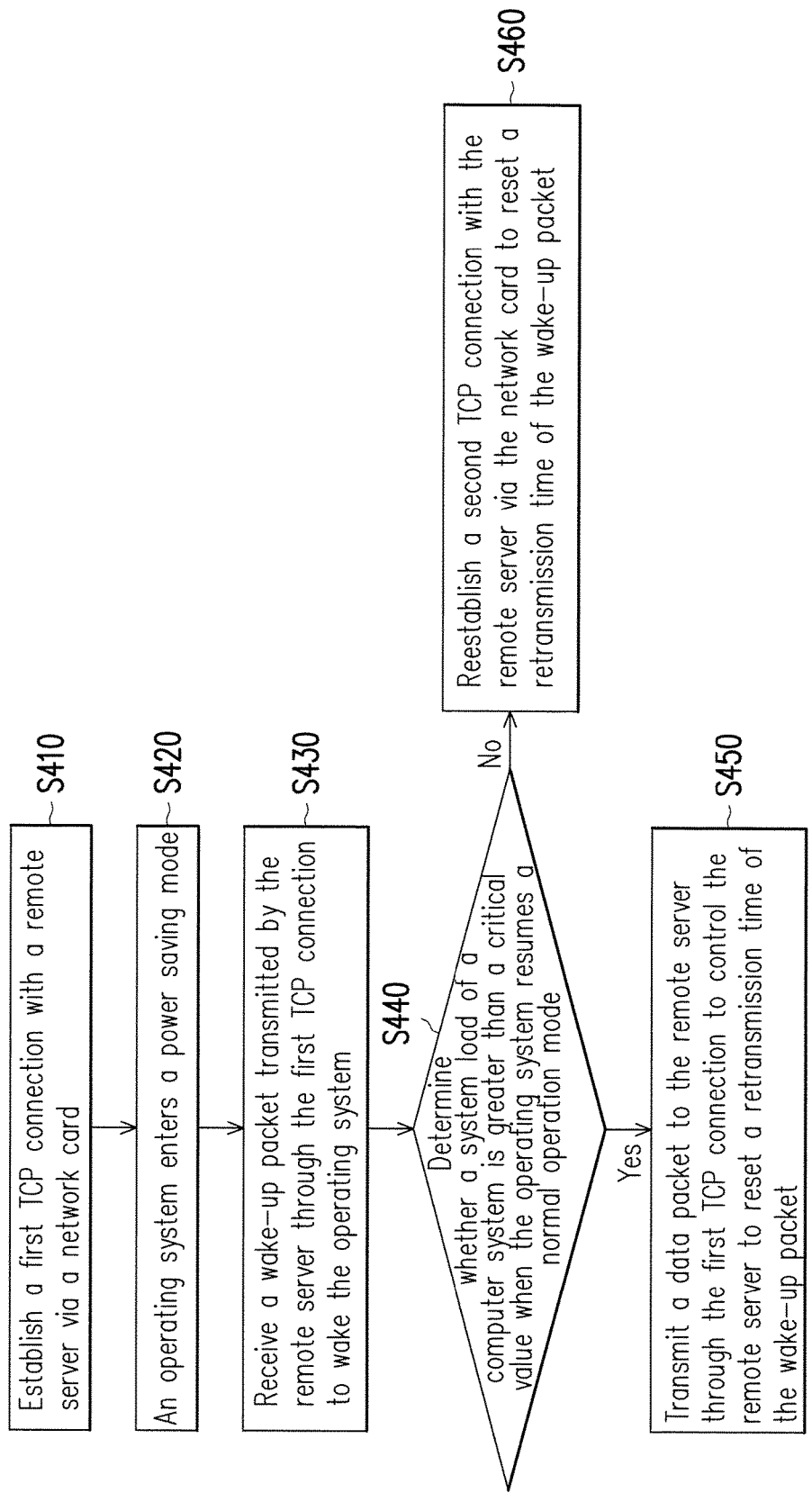
FIG. 4 is a flow chart of a method for maintaining TCP connection illustrated according to another embodiment of the invention.

Moreover, in other embodiments of the invention, the computer system 200 can also reset the retransmission time of the remote server 230 transmitting the wake-up packet according to the condition of the system load. For instance, FIG. 4 is a flow chart of a method for maintaining TCP connection illustrated according to another embodiment of the invention. Referring to FIG. 4, the method of the present embodiment is adapted to the computer system 200 of FIG. 2. In the following, the detailed steps of the method for maintaining TCP connection of the invention is described with reference to each device in the computer system 200.

In step S410, the processor 220 establishes a first TCP connection with the remote server 230 via the network card 210. In step S420, the operating system enters a power saving mode. In step S430, the processor 220 receives the wake-up packet transmitted by the remote server 230 through the first TCP connection via the network card 210 so as to wake up the operating system. In step S440, the processor 220 determines whether the system load of the computer system 200 is greater than a critical value when the operating system resumes a normal operation mode. In step S450, if the system load is greater than the critical value, the processor 220 transmits a data packet to the remote server 230 through the first TCP connection to control the remote server 230 to reset the retransmission time of the wake-up packet. In step S460, if the system load is not greater than the critical value, the processor 220 reestablishes a second TCP connection with the remote server 230 via the network card 210 to reset the retransmission time of the wake-up packet. The embodiments of steps S410 to S430 are respectively the same or similar to steps S310 to S330 in the above embodiments, and are therefore not repeated herein.

The greatest difference from the above embodiments lies in that, in step S440, the processor 220 determines whether the system load of the computer system 200 is greater than a critical value when the operating system resumes a normal operation mode. Specifically, the system load condition of the computer system 200 is the basis for the selection of the method for resetting the retransmission time of the wake-up packet. For instance, if the current system load is greater, the selection of disconnecting the first TCP connection between the computer system 200 and the remote server 230 and establishing a new second TCP connection may raise a burden to the system load of the computer system 200. Therefore, if the system load is greater, a data packet is transmitted to the remote server 230 directly through the first TCP connection to control the remote server 230 to reset the retransmission time of the wake-up packet.

Moreover, in the present embodiment, a critical value that can be used to differentiate system load conditions is further provided, and the method of resetting the retransmission time of the wake-up packet can be selected according to the differentiating result. Specifically, in step S450, if the system load is greater than the critical value, the processor 220 transmits a data packet to the remote server 230 through the first TCP connection to control the remote server 230 to reset the retransmission time of the wake-up packet. In step S460, if the system load is not greater than the critical value, the processor 220 reestablishes a second TCP connection with the remote server 230 via the network card 210 to reset the retransmission time of the wake-up packet.

Based on the above, in the method for maintaining TCP connection and the computer system using the method of the invention, when the computer system resumes a normal operation mode, a data packet is actively transmitted to the remote server to reset the retransmission time of the TCP connection back to a system preset time, or a new TCP connection with the remote server is reestablished to reset the retransmission time of the TCP connection. Accordingly, disconnection of the TCP connection between the remote server and the computer system due to excessive retransmission time of the remote server transmitting the wake-up packet can be prevented, thus ensuring the remote server can implement WOL of the computer system.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method for maintaining transmission control protocol (TCP) connection, adapted to a computer system having a network card and a processor, wherein the processor executes an operating system, the method comprising:
   establishing a first TCP connection with a remote server via the network card;
   the operating system entering a power saving mode;
   receiving a wake-up packet transmitted by the remote server through the first TCP connection to wake up the operating system, wherein the remote server is configured to wait for the computer system to return an acknowledgment (ACK) packet each time after transmitting the wake-up packet, and to retransmit the wake-up packet and double the retransmission time if the ACK packet is not received after waiting the retransmission time; and
   resetting, by the computer system, a retransmission time of the wake-up packet transmitted by the remote server to a preset retransmission time when the operating system resumes a normal operation mode,
   wherein the step of resetting the retransmission time of the remote server transmitting the wake-up packet comprises:
   transmitting, by the computer system, a data packet to the remote server through the first TCP connection to control the remote server to reset the retransmission time of the wake-up packet.

2. The method of claim 1, wherein the step of resetting the retransmission time of the remote server transmitting the wake-up packet comprises:
   disconnecting the first TCP connection; and
   reestablishing a second TCP connection with the remote server via the network card to reset the retransmission time of the wake-up packet.

3. The method of claim 1, further comprising:
   determining whether a system load of the computer system is greater than a critical value when the operating system resumes the normal operation mode;
   transmitting a data packet to the remote server through the first TCP connection if the system load is greater than the critical value to control the remote server to reset the retransmission time of the wake-up packet; and
   reestablishing a second TCP connection with the remote server via the network card if the system load is not greater than the critical value to reset the retransmission time of the wake-up packet.

4. A computer system, comprising:
   a network card; and
   a processor coupled to the network card and executing an operating system, wherein
   the processor is configured to establish a first TCP connection with a remote server via the network card, receive a wake-up packet transmitted by the remote server through the first TCP connection via the network card during the operating system being in a power saving mode to wake up the operating system, wherein the remote server is configured to wait for the computer system to return an acknowledgment (ACK) packet each time after transmitting the wake-up packet, and to retransmit the wake-up packet and double the retransmission time if the ACK packet is not received after waiting the retransmission time, and the processor is further configured to reset a retransmission time of the wake-up packet transmitted by the remote server to a preset retransmission time when the operating system resumes a normal operation mode,
   wherein the processor is further configured to transmit a data packet to the remote server through the first TCP connection to control the remote server to reset the retransmission time of the wake-up packet.

5. The computer system of claim 4, wherein the processor is configured to disconnect the first TCP connection and reestablish a second TCP connection with the remote server via the network card to reset the retransmission time of the wake-up packet.

6. The computer system of claim 4, wherein the processor is further configured to:
   determine whether a system load of the computer system is greater than a critical value when the operating system resumes the normal operation mode;
   transmit a data packet to the remote server through the first TCP connection if the system load is greater than the critical value to control the remote server to reset the retransmission time of the wake-up packet; and
   reestablish a second TCP connection with the remote server via the network card if the system load is not greater than the critical value to reset the retransmission time of the wake-up packet.

* * * * *